United States Patent [19]
Rozman

[11] Patent Number: 5,625,541
[45] Date of Patent: *Apr. 29, 1997

[54] LOW LOSS SYNCHRONOUS RECTIFIER FOR APPLICATION TO CLAMPED-MODE POWER CONVERTERS

[75] Inventor: Allen F. Rozman, Richardson, Tex.

[73] Assignee: Lucent Technologies Inc., Murray Hill, N.J.

[ * ] Notice: The term of this patent shall not extend beyond the expiration date of Pat. No. 5,303,138.

[21] Appl. No.: 503,684

[22] Filed: Jul. 18, 1995

Related U.S. Application Data

[63] Continuation-in-part of Ser. No. 225,027, Apr. 8, 1994, Pat. No. 5,528,482, which is a continuation-in-part of Ser. No. 54,918, Apr. 29, 1993, Pat. No. 5,303,138.

[51] Int. Cl.$^6$ .......................... H02M 7/217; H02M 3/335
[52] U.S. Cl. ................................ 363/21; 363/20; 363/89; 363/147; 327/309
[58] Field of Search .................. 363/21, 20, 89, 363/97, 126, 127; 327/309

[56] References Cited

U.S. PATENT DOCUMENTS

| | | | |
|---|---|---|---|
| 5,066,900 | 11/1991 | Bassett | 323/224 |
| 5,126,931 | 6/1992 | Jitaru | 363/21 |
| 5,268,830 | 12/1993 | Loftus, Jr. | 363/17 |
| 5,274,543 | 12/1993 | Loftus, Jr. | 363/127 |
| 5,303,138 | 4/1994 | Rozman | 363/21 |
| 5,353,212 | 10/1994 | Loftus, Jr. | 363/17 |
| 5,528,482 | 6/1996 | Rozman | 363/21 |

*Primary Examiner*—Peter S. Wong
*Assistant Examiner*—Shawn Riley

[57] ABSTRACT

A synchronous rectifier for use with a clamped-mode power converter uses in one embodiment a hybrid rectifier with a MOSFET rectifying device active in one first cyclic interval of the conduction/nonconduction sequence of the power switch and a second rectifying device embodied in one illustrative embodiment as a low voltage bipolar diode rectifying device active during an alternative interval to the first conduction/nonconduction interval. The gate drive to the MOSFET device is continuous at a constant level for substantially all of the second interval which enhances efficiency of the rectifier. The bipolar rectifier device may also be embodied as a MOSFET device. The subject rectifier may be used in both forward- and flyback-type power converters.

22 Claims, 5 Drawing Sheets

LOW LOSS SYNCHRONOUS RECTIFIER FOR APPLICATION TO CLAMPED-MODE POWER CONVERTERS

CROSS-REFERENCE TO RELATED APPLICATION

This application is a continuation-in-part of application Ser. No. 08/225,027, now U.S. Pat. No. 5,528,482, filed on Apr. 8, 1994, for a "Low Loss Synchronous Rectifier for Application to Clamped-Mode Power Converters," that is a continuation-in-part of application Ser. No. 08/054,918, now U.S. Pat. No. 5,303,138, filed on Apr. 29, 1993, for a "Low Loss Synchronous Rectifier for Application to Clamped-Mode Power Converters."

TECHNICAL FIELD OF THE INVENTION

This invention relates to switching-type power converters and in particular to forward- and flyback-type converters having a clamp-mode topology.

Self synchronized rectifiers refer to rectifiers using MOSFET rectifying devices having control terminals which are driven by voltages of the windings of a power transformer or integrated magnetic device in order to provide the rectification of the output of the integrated magnetic device. Use of synchronous rectifiers has been limited however by the inefficiency of these rectifiers in buck-derived converter topologies. Efficiency is limited due to the nature of switching of the buck-derived converters (i.e buck, buck-boost, boost converters including forward- and flyback-type topologies) and due to the variability of the integrated magnetic device reset voltages in the forward-type converters. This variability of reset voltage limits the conduction time of one of the MOSFET rectifiers, diminishing the effectiveness and efficiency of the rectifier. This is because the rectifying devices do not conduct for the full switching period and the gate drive energy of one of the rectifiers is dissipated.

SUMMARY OF THE INVENTION

A synchronous rectifier is combined with a clamped-mode buck derived power converter. In one illustrative embodiment a hybrid rectifier includes a MOSFET rectifying device active in a first cyclic interval of the conduction/nonconduction sequence of the power switch. A second rectifying device embodied in one illustrative embodiment as a low forward voltage drop bipolar diode rectifying device is active during an alternative interval to the first conduction/nonconduction interval. The gate drive to the MOSFET device is maintained continuous at a constant level for substantially the all of the second interval by the clamping action of the clamping circuitry of the converter. This continuous drive enhances the efficiency of the rectifier.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
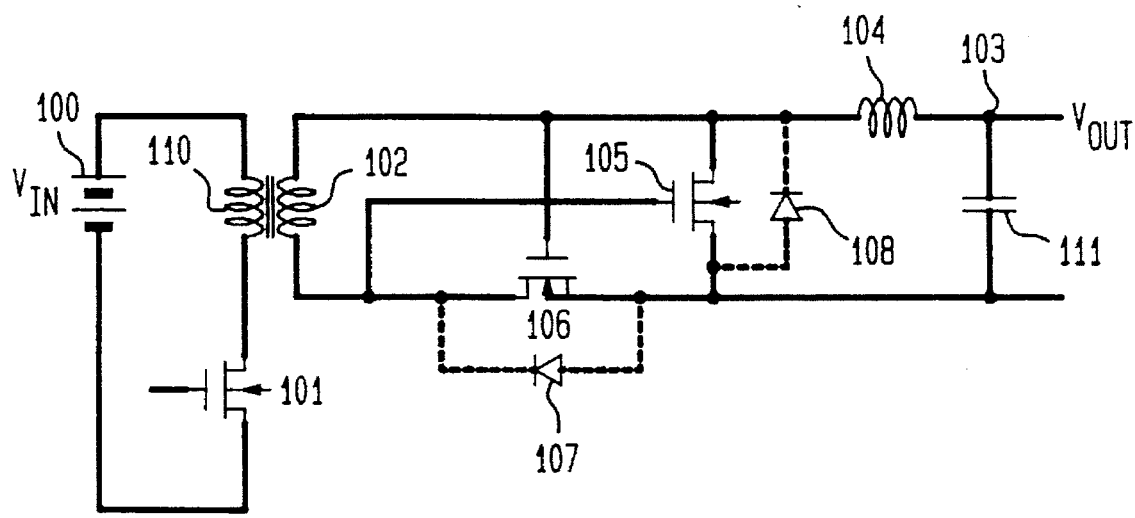
FIG. 1 is a schematic of a forward-type converter, of the prior art, having a synchronous rectifier.

In the converter shown in the FIG. 1, a conventional forward-type topology of the prior art with an isolation power transformer combined with a self-synchronized synchronous rectifier. In such a rectifier, control devices are used with the control terminals being driven by an output winding of the power transformer.

A DC voltage input $V_{in}$ at input 100 is connected to the primary winding 110 of the power transformer by a MOSFET power switch 101. The secondary winding 102 is connected to an output lead 103 through an output filter inductor 104 and a synchronous rectifier including the MOSFET rectifying devices 105 and 106. Each rectifying device includes a body diode 108 and 107, respectively.

With the power switch 101 conducting, the input voltage is applied across the primary winding 110. The secondary winding 102 is oriented in polarity to respond to the primary voltage with a current flow through the inductor 104; the load is connected to output lead 103 and back through the MOSFET rectifier 106 to the secondary winding 102. Continuity of current flow in the inductor 104 when the power switch 101 is non-conducting is maintained by the current path provided by the conduction of the MOSFET rectifier 105. An output filter capacitor 111 shunts the output of the converter.

Figure 2:
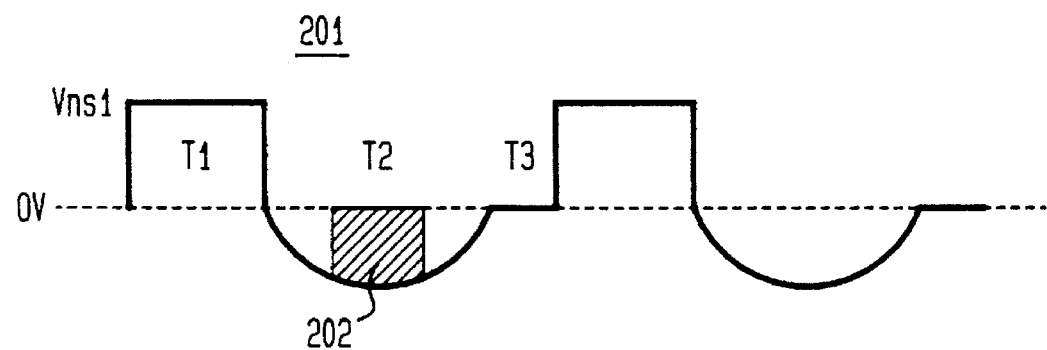
FIG. 2 is a voltage waveform of the secondary transformer winding of the converter of FIG. 1.

Conductivity of the MOSFET rectifiers is controlled by the gate drive signals provided by the voltage appearing across the secondary winding 102. This voltage is shown graphically by the voltage waveform 201 in FIG. 2. During the conduction interval $T_1$ of the power switch 101, the secondary winding voltage $V_{ns1}$ charges the gate of MOSFET 106 to bias it conducting for the entire interval $T_1$. The MOSFET 105 is biased non conducting during the $T_1$ interval. The conducting MOSFET rectifying device 106 provides the current path allowing energy transfer to the output during the interval $T_1$. The gate of MOSFET rectifier 106 is charged in response to the input voltage $V_{in}$. All of the gate drive energy due to this voltage is dissipated.

As the power MOSFET switch 101 turns off the voltage $V_{ns1}$ across the secondary winding 102 reverses polarity just as the time interval $T_2$ begins. This voltage reversal initiates a reset of the transformer magnetizing inductance, resonantly discharges the gate of MOSFET rectifier 106 and begins charging the gate of MOSFET rectifier 105. As shown by the voltage waveform of FIG. 2, the voltage across the secondary winding 102 is not a constant value, but is rather a variable voltage that collapses to zero in the subsequent time interval $T_3$, which occurs prior to the subsequent conduction interval of the power switch 101. This voltage is operative to actually drive the rectifier 105 conducting over only a portion of the time interval $T_2$ which is indicated by the cross hatched area 202 associated with the waveform 201 in FIG. 2. This substantially diminishes the performance of the rectifier 105 as a low loss rectifier device. This is aggravated by the fact that the body diode 108 of the rectifier 105 has a large forward voltage drop which is too large to efficiently carry the load current.

The loss of efficiency of the synchronous rectifier limits the overall efficiency of the power converter and has an adverse effect on the possible power density attainable. Since the synchronous rectifier 105 does not continuously conduct throughout the entire switching period, a conventional rectifier diode (e.g., connected in shunt with rectifier 105) capable of carrying the load current is required in addition to MOSFET rectifier 105. This inefficiency is further aggravated by the gate drive energy dissipation associated with the MOSFET rectifier 106. This gate drive loss may exceed the conduction loss for MOSFET rectifier 106, at high switching frequency (e.g., >300 Khz).

Figure 3:
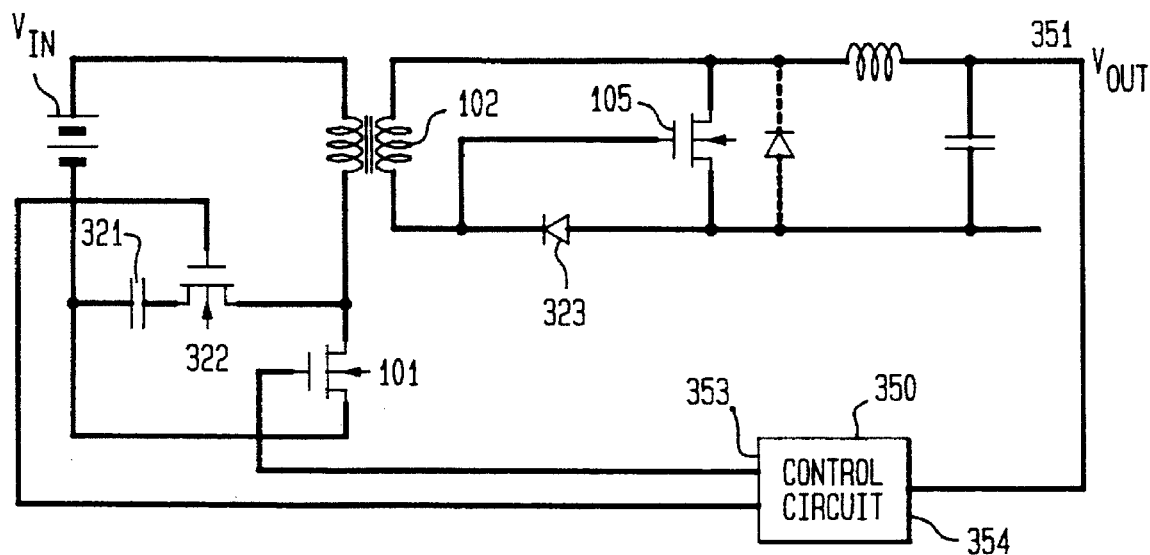
FIG. 3 is a schematic of a clamped-mode forward-type converter with a synchronous rectifier embodying the principles of the invention.

The efficiency of a forward-type converter with synchronous rectification is significantly improved according to the invention by using a clamp circuit arrangement to limit the reset voltage and by using a low forward voltage drop diode in the rectifying circuitry. Such an arrangement is shown in the schematic of FIG. 3. In this forward-type converter, the power MOSFET device 101 is shunted by a series connection of a clamp capacitor 321 and a MOSFET switch device 322. The conducting intervals of power switch 101 and MOSFET device 322 are mutually exclusive. The duty cycle of power switch 101 is D and the duty cycle of MOSFET device 322 is 1-D. The voltage inertia of the capacitor 321 limits the amplitude of the reset voltage appearing across the magnetizing inductance during the non-conducting interval of the MOSFET power switch 101.

The diode 323 of the synchronous rectifier, shown in FIG. 3, has been substituted for the MOSFET device 106 shown in the FIG. 1. Due to the dissipation of gate drive energy the overall contribution of the MOSFET rectifier 106 in FIG. 1 is limited. The clamping action of the clamping circuitry results in the constant voltage level 402 shown in the voltage waveform 401, across the secondary winding 102, in the time period $T_2$. This constant voltage applied to the gate drive of the MOSFET rectifier 105 drives it into conduction for the entire $T_2$ reset interval. In this arrangement there is no need for a bipolar or a body diode shunting the MOSFET rectifier 105. An advantage in the clamped mode converter is that the peak inverse voltage applied to the diode 323 is much less than that applied to the similarly positioned MOSFET device in FIG. 1. Accordingly the diode 323 may be a very efficient low voltage diode which may be embodied by a low voltage diode normally considered unsuitable for rectification purposes.

Figure 4:
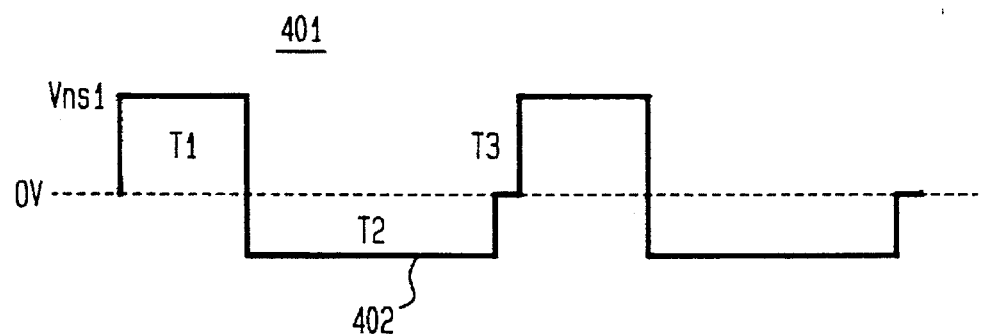
FIG. 4 is a voltage waveform of the secondary transformer winding of the converter of FIG. 3.

In the operation of the clamped mode forward-type converter the MOSFET switch 322 is turned off just prior to turning the MOSFET power switch on. Energy stored in the parasitic capacitances of the MOSFET switching devices 101 and 322 is commutated to the leakage inductance of the power transformer, discharging the capacitance down toward zero voltage. During the time interval $T_3$ shown in FIG. 4, voltage across the primary winding is supported by the leakage inductance. The voltage across the secondary winding 102 drops to zero value as shown in the FIG. 4. With this zero voltage level of the secondary winding, the output inductor resonantly discharges the gate capacitance of the MOSFET rectifying device 105 and eventually forward biases the bipolar diode 323. The delay time $T_3$ is a fixed design parameter and is a factor in the control of the power switches 101 and 322, which may be switched to accommodate soft waveforms. This synchronous rectification circuit of FIG. 3 provides the desired efficiencies lacking in the arrangement of the circuit shown in FIG. 1.

Control of the conductivity of the power switching devices 101 and 322 is by means of a control circuit 350 which is connected, by lead 351, to an output terminal 103 of the converter to sense the output terminal voltage. The control circuit 350 is connected by leads 353 and 354 to the drive terminals of the power switches 101 and 322. The drive signals are controlled to regulate an output voltage at output terminal. The exact design of a control circuit, to achieve the desired regulation, is well known in the art and hence is not disclosed in detail herein. This control circuit 350 is suitable for application to the converters of FIGS. 5, 6, 7, 8 and 9.

Figure 5:
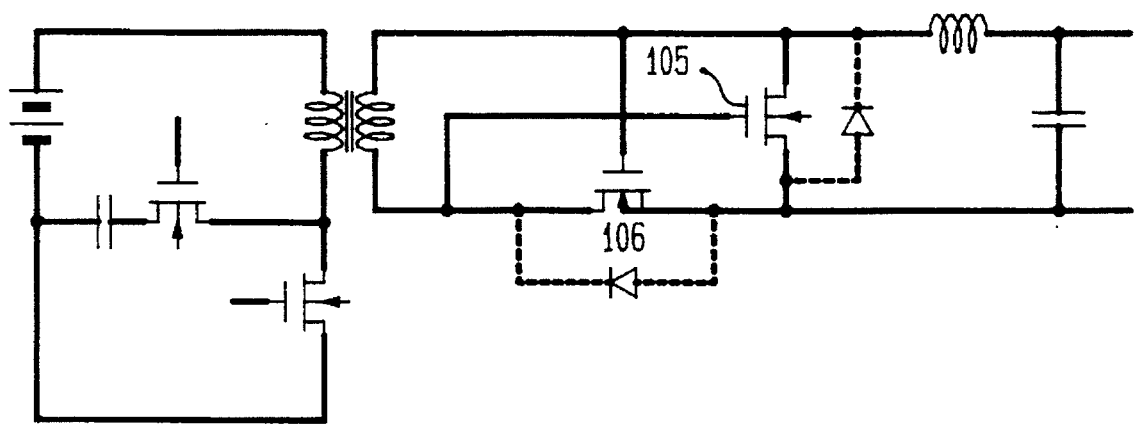
FIG. 5 is a schematic of another version of a clamped-mode forward-type converter with a synchronous rectifier embodying the principles of the invention.

A modified version of the circuit of FIG. 3 is shown in the circuit schematic of FIG. 5. The converter of FIG. 5 is a clamped mode forward-type converter having two gated synchronous rectifying devices 105 and 106. In this embodiment of the synchronous rectifier the synchronized rectifying device 106 can be used without adversely affecting the converter efficiency at lower operating frequencies.

Figure 6:
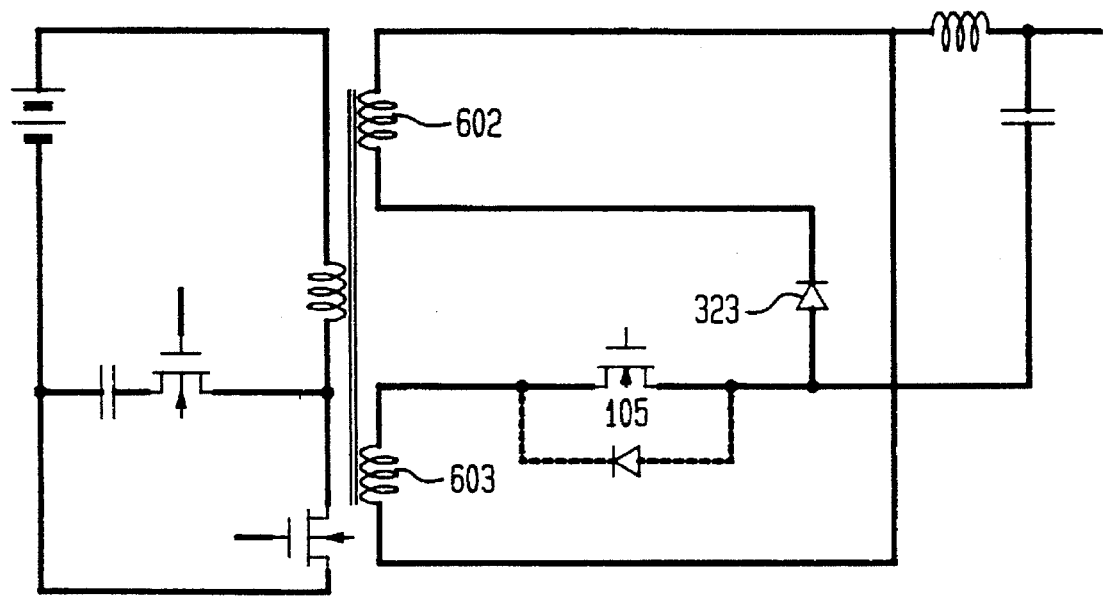
FIG. 6 is a schematic of another version of a clamped-mode forward-type converter with a synchronous rectifier and a center tapped secondary winding embodying the principles of the invention.

The circuit of FIG. 6 is a clamped mode forward-type converter having a rectifier analogous to that of FIG. 3 in using one bipolar rectifying diode. The secondary winding is tapped creating two secondary winding segments 603 and 602.

Figure 7:
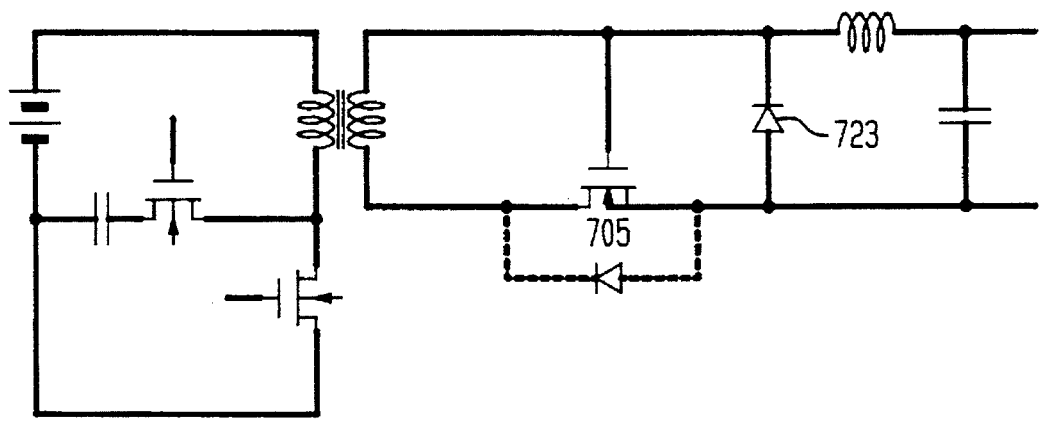
FIG. 7 is a schematic of a clamped-mode flyback-type converter with a synchronous rectifier embodying the principles of the invention.

The converter of FIG. 7 operates in a flyback mode. The bipolar and synchronous rectifier device are in a reversed connection from the connection of FIG. 3 to accommodate the flyback operation.

Figure 8:
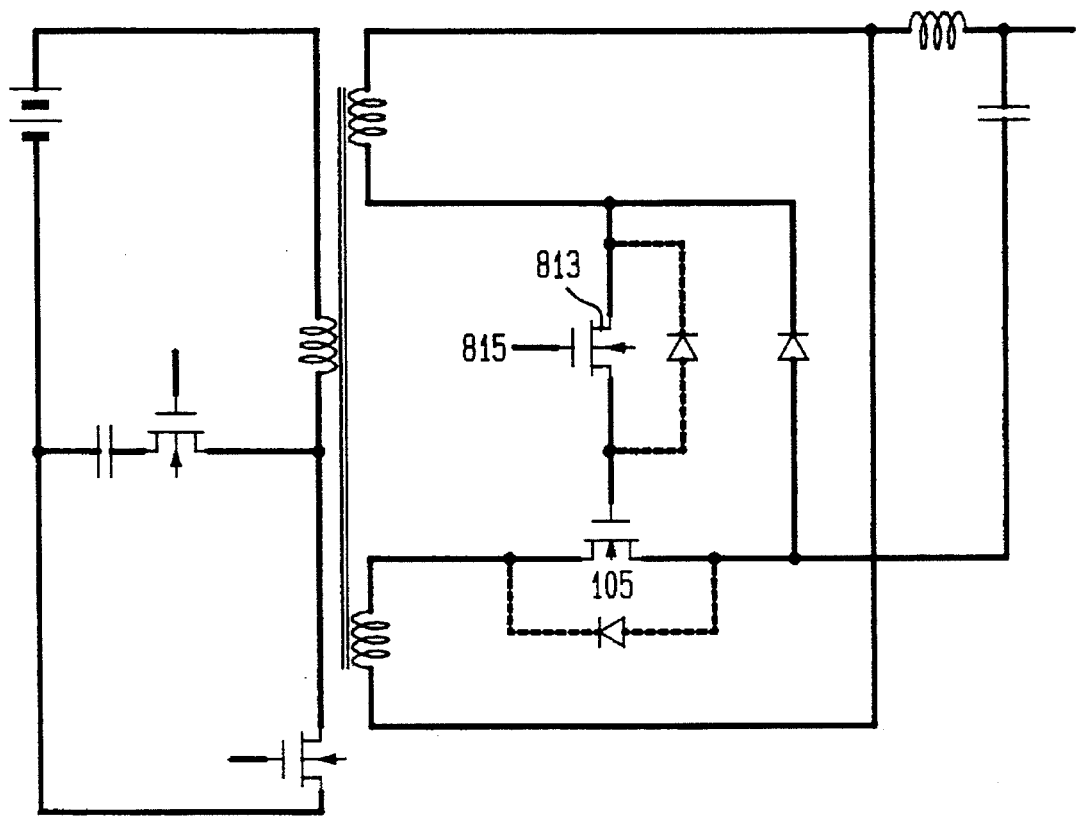
FIG. 8 is a schematic of another version of a clamped-mode forward-type converter with a synchronous rectifier and a center tapped secondary winding embodying the principles of the invention.

In some integrated magnetics applications direct application of the gate drive signal directly from the secondary winding may result in voltage spikes exceeding the rating of the gate. As illustrated in FIG. 8, a small signal MOSFET device 813 is connected to couple the gate drive to the MOSFET rectifying device 105. This device may be controlled by the control drive lead 815 to limit the peak voltage applied to the gate of rectifier 105. The MOSFET synchronous rectifier is then discharged through the body diode of the MOSFET device 813. While the converters of FIGS. 3–8 have employed a transformer-based integrated magnetic device, one of ordinarily skill in the art will appreciate that other types of integrated magnetic devices are well within the scope of the invention.

Figure 9:
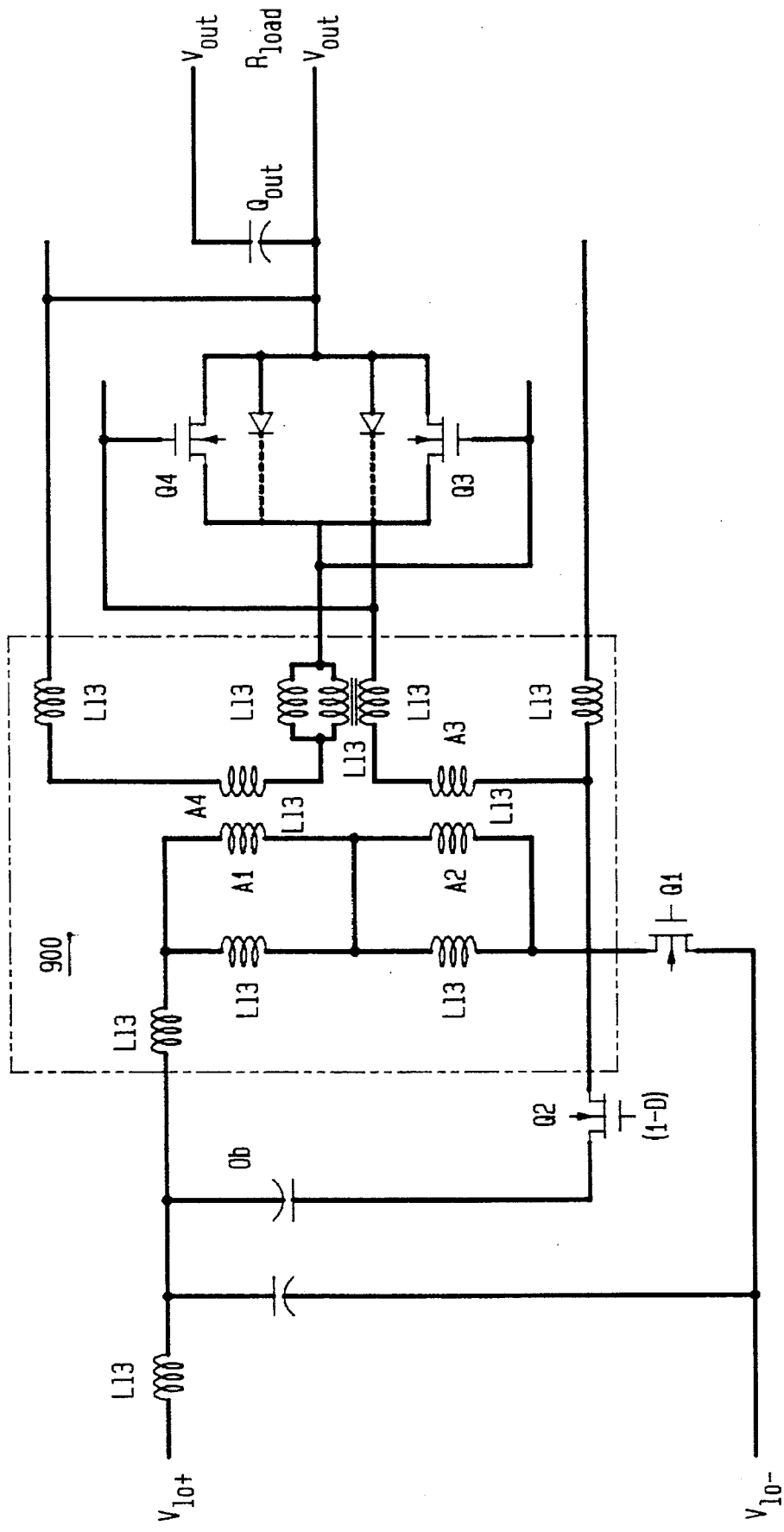
FIG. 9 is a schematic of still another version of a clamp-mode forward-type converter with a synchronous rectifier and a center tapped secondary winding of an integrated magnetic device embodying the principles of the invention.
Figure 1:
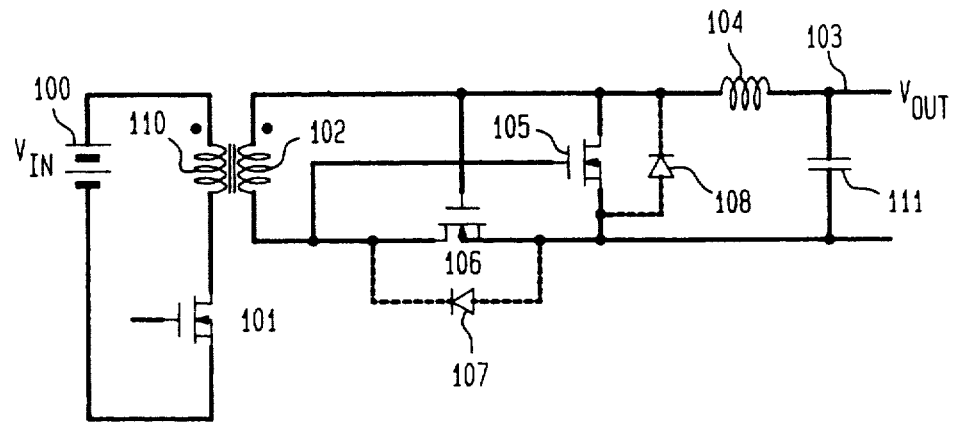
Figure 2:
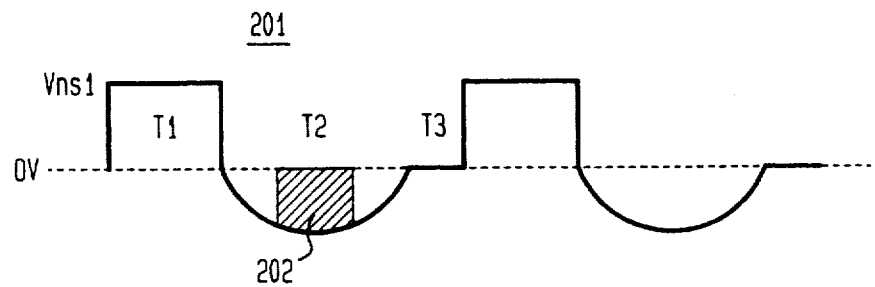
Figure 3:
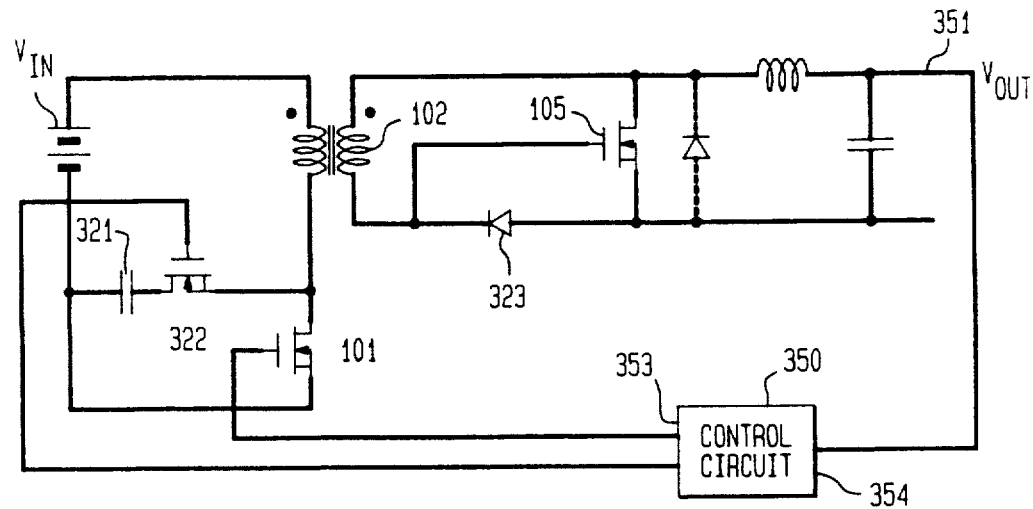
Figure 4:
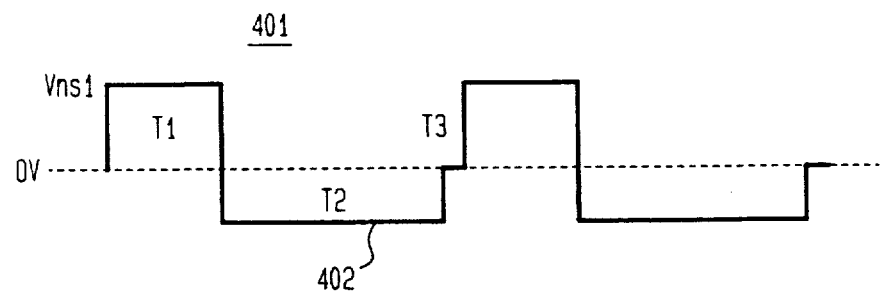
Figure 5:
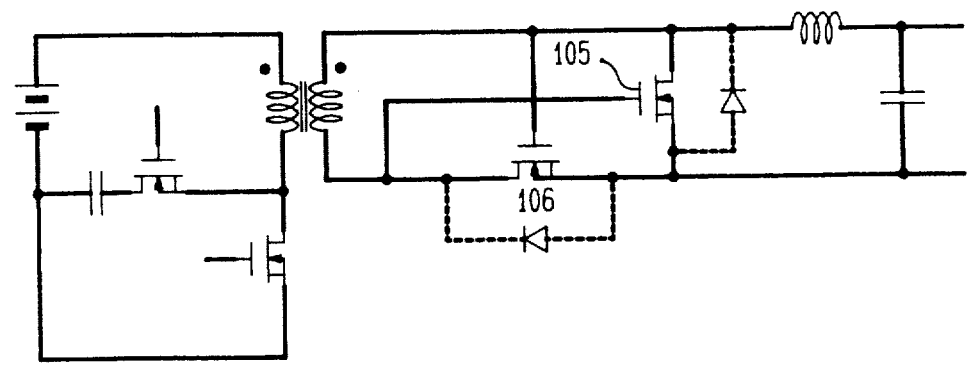
Figure 6:
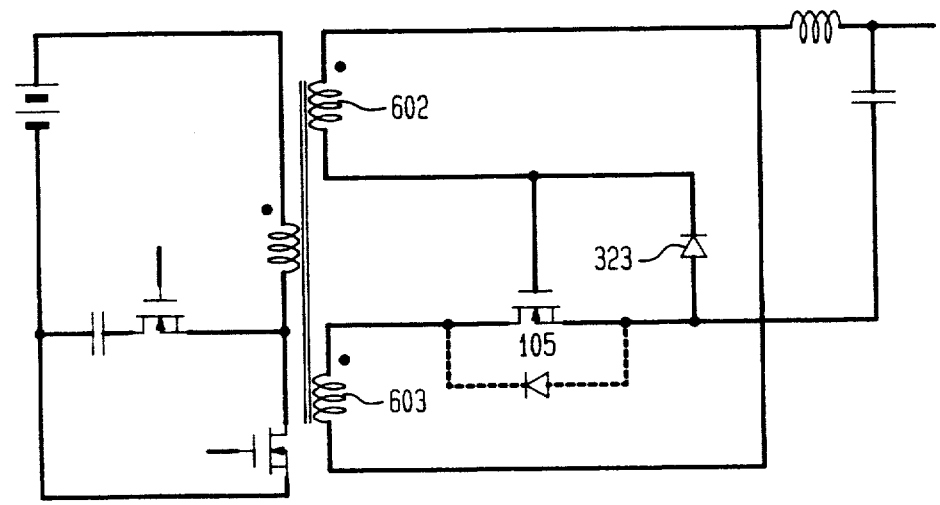
Figure 7:
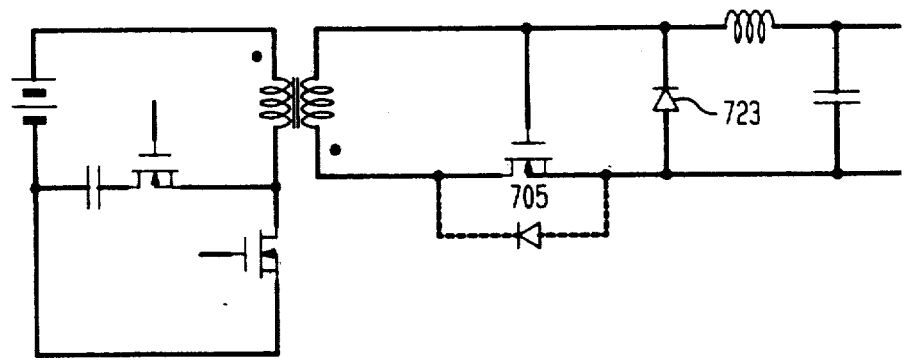
Figure 8:
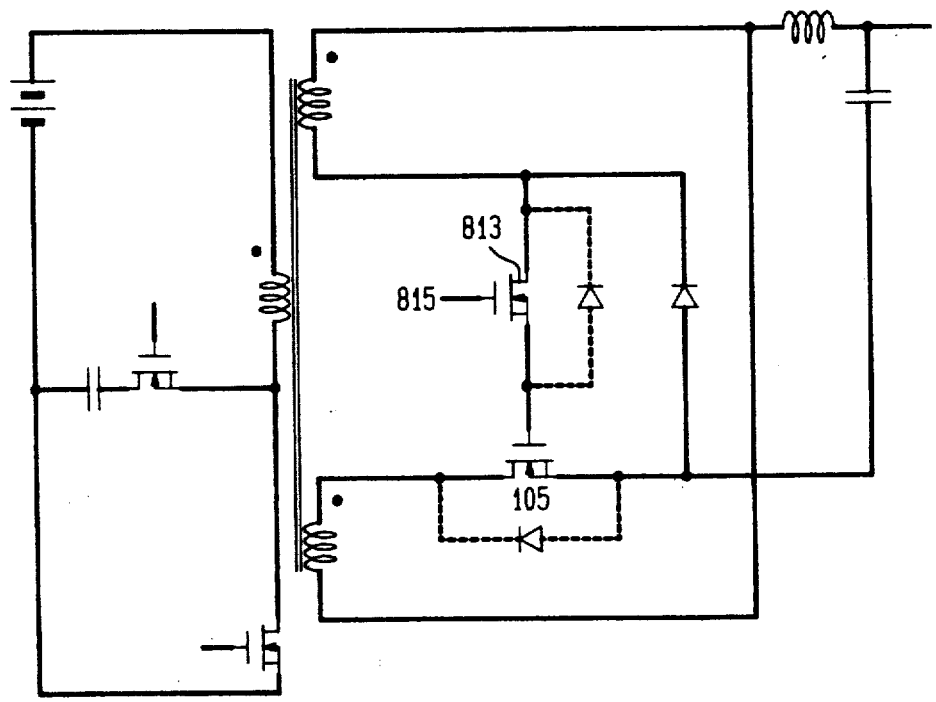
Figure 9:
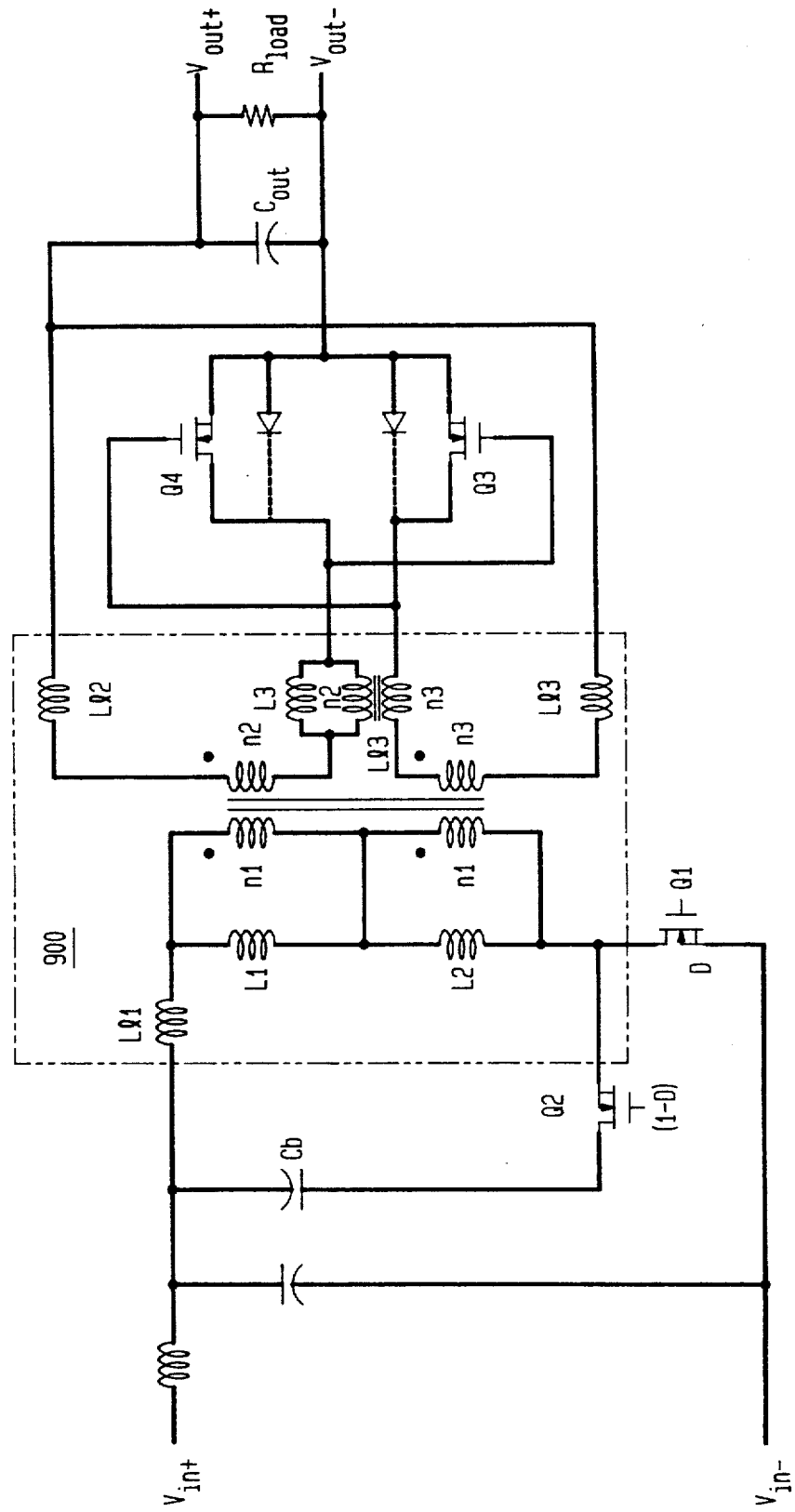

The converter of FIG. 9 incorporates an integrated magnetic device 900 with a clamped-mode circuit and a synchronous rectifier as described with respect to the previous FIGUREs. The integrated magnetic device 900 comprises an isolation transformer and an output inductor packaged together in a single device and formed about a common magnetic core. The integrated magnetic device 900 eliminates a need for a separate inductor in the output of the converter, thereby reducing the size, cost and complexity of the circuit. Additionally, integration of the isolation transformer with the output inductor may have positive operational effects on the converter as a whole by allowing the transformer to interact electromagnetically with the inductor. The benefits of such interaction are well known by those of ordinary skill in the art.

The integrated magnetic device 900 as illustrated is preferably based on an "E"-type magnetic core consisting of three legs, although other magnetic core configurations are equally applicable. A primary winding n1 is wound around one leg, usually a center leg, and a pair of secondary windings n2, n3 are wound around the remaining legs. Gaps may be introduced into each leg to adjust the magnetic characteristics (e.g., inductance or reluctance) of the integrated magnetic device 900.

Although the present invention has been described in detail, those skilled in the art should understand that they can make various changes, substitutions and alterations herein without departing from the spirit and scope of the invention in its broadest form.

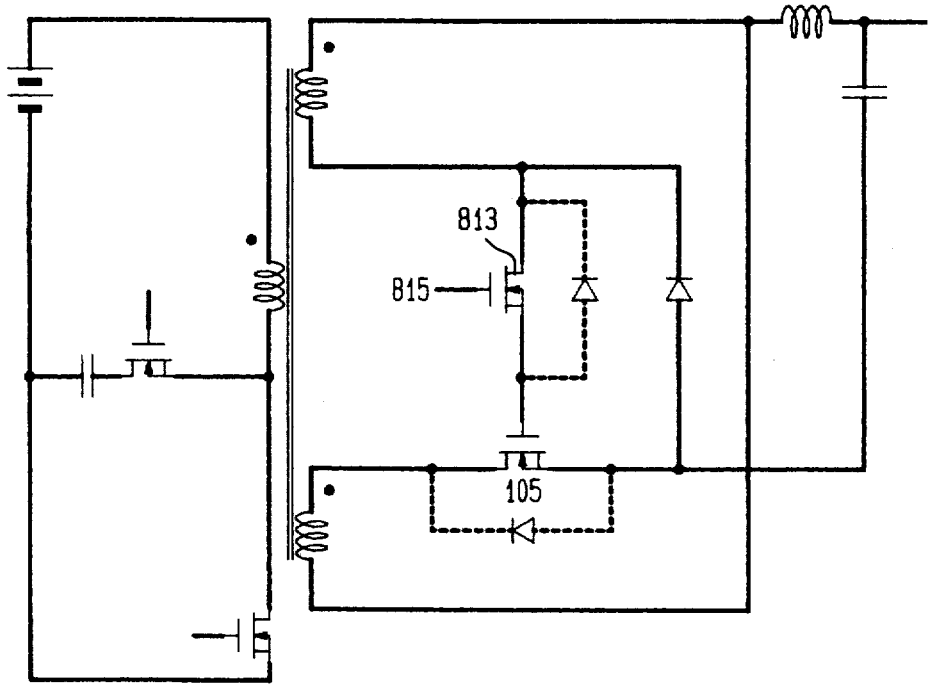

What is claimed is:

1. A power converter, comprising:
   an input for accepting a DC voltage;
   an integrated magnetic device having a primary winding and a secondary winding;
   a power switch for periodically connecting the input to the primary winding;
   an output for accepting a load to be energized;
   a clamping circuit for limiting a voltage across the secondary winding during a first interval of a cyclic period of the power converter; and
   a rectifier circuit connecting the secondary winding to the output, the rectifier circuit, comprising:
      a synchronous rectification device with a control terminal connected to be responsive to a signal across the secondary winding such that the synchronous rectification device conducts a load current during the first interval; and
      a diode connected for enabling conduction of the load current during a second interval other than the first interval.

2. The power converter as recited in claim 1 wherein the integrated magnetic device has a transformer portion and an inductor portion.

3. The power converter as recited in claim 1 wherein the rectifier circuit further comprises a first gate voltage limiting device coupled to the synchronous rectification device.

4. The power converter as recited in claim 1 wherein the power converter is constructed to operate as a forward-type converter.

5. The power converter as recited in claim 1 wherein the power converter is constructed to operate as a flyback-type converter.

6. A power converter, comprising:
   an input for accepting a DC voltage;
   an integrated magnetic device having a primary winding and a secondary winding;
   a power switch for periodically connecting the input to the primary winding;
   an output for accepting a load to be energized;
   a clamping circuit for limiting a voltage across the secondary winding during a first interval of a cyclic period of the power converter; and
   a rectifier circuit connecting the secondary winding to the output, the rectifier circuit, comprising:
      a first synchronous rectification device with a control terminal connected to be responsive to a signal across the secondary winding such that the synchronous rectification device conducts a load current during the first interval; and
      a second synchronous rectification device with a control terminal connected to be responsive to a signal across the secondary winding such that the second synchronous rectification device conducts the load current during a second interval other than the first interval.

7. The power converter as recited in claim 6 wherein the integrated magnetic device has a transformer portion and an inductor portion.

8. The power converter as recited in claim 6 wherein the rectifier circuit, further comprises:
   a first gate voltage limiting device coupled to the first synchronous rectification device; and
   a second gate voltage limiting device coupled to the second synchronous rectification device.

9. The power converter as recited in claim 6 wherein the power converter is constructed to operate as a forward-type converter.

10. The power converter as recited in claim 6 wherein the power converter is constructed to operate as a flyback-type converter.

11. A switching mode power converter, comprising:
    an integrated magnetic device having a primary winding and a secondary winding, the integrated magnetic device further having a magnetizing inductance therein requiring periodic recycling;
    a first power stage for converting a DC input into a periodic pulsed voltage applied to the primary winding of the integrated magnetic device, the first power stage having a clamping circuit for limiting a voltage of the integrated magnetic device during the periodic recycling; and
    a second power stage for rectifying an output of the secondary winding of the integrated magnetic device and applying it to a load to be energized, the second power stage having a synchronous rectifier having a rectifying device with a control gate connected to be responsive to a signal across the secondary winding such that the rectifying device conducts a load current during the periodic recycling when the clamping circuit is active, the second power stage further having a diode connected for enabling conduction of the load current when the rectifying device is nonconducting.

12. The switching mode power converter as recited in claim 11 wherein the integrated magnetic device has a transformer portion and an inductor portion.

13. The switching mode power converter as recited in claim 11 wherein the synchronous rectifier further comprises a gate voltage limiting device coupled to the rectifying device.

14. The switching mode power converter as recited in claim 11 wherein the secondary winding is tapped and separated into a first and a second winding segment, the first winding segment thereby connected to the rectifying device and the second winding segment thereby connected to the diode.

15. The switching mode power converter as recited in claim 11 wherein the switching mode power converter is constructed to operate as a forward-type converter.

16. The switching mode power converter as recited in claim 11 wherein the switching mode power converter is constructed to operate as a flyback-type converter.

17. A switching mode power converter, comprising:
    an integrated magnetic device having a primary winding and a secondary winding, the integrated magnetic device further having a magnetizing inductance therein requiring periodic recycling;

a first power stage for converting a DC input into a periodic pulsed voltage applied to the primary winding of the integrated magnetic device, the first power stage having a clamping circuit for limiting a voltage of the integrated magnetic device during the periodic recycling; and a second power stage for rectifying an output of the secondary winding of the integrated magnetic device and applying it to a load to be energized, the second power stage having a synchronous rectifier having a first rectifying device with a control gate connected to be responsive to a signal across the secondary winding such that the first rectifying device conducts a load current during the periodic recycling when the clamping circuit is active, the synchronous rectifier further having a second rectifying device with a control gate connected to be responsive to a signal across the secondary winding such that the second rectifying device conducts load current when the first rectifying device is nonconducting.

18. The switching mode power converter as recited in claim 17 wherein the integrated magnetic device has a transformer portion and an inductor portion.

19. The switching mode power converter as recited in claim 17 wherein the synchronous rectifier, further comprises:

a first gate voltage limiting device coupled to the first rectifying device; and a second gate voltage limiting device coupled to the second rectifying device.

20. The switching mode power converter as recited in claim 17 wherein the secondary winding is tapped and separated into a first and a second winding segment, the first winding segment thereby connected to the first rectifying device and the second winding segment thereby connected to the second rectifying device.

21. The switching mode power converter as recited in claim 17 wherein the switching mode power converter is constructed to operate as a forward-type converter.

22. The switching mode power converter as recited in claim 17 wherein the switching mode power converter is constructed to operate as a flyback-type converter.

* * * * *

UNITED STATES PATENT AND TRADEMARK OFFICE
CERTIFICATE OF CORRECTION

PATENT NO. : 5,625,541
DATED : April 29, 1997
INVENTOR(S) : Allen F. Rozman

It is certified that error appears in the above-identified patent and that said Letters Patent is hereby corrected as shown below:

The title page should be deleted and substitute therefor the attached title page. Delete Drawing Sheets 1-5, and substitute therefor the Drawing Sheets, consisting of FIGS. 1-9, as shown on the attached pages.

Signed and Sealed this

Twenty-eighth Day of April, 1998

*Attest:*

BRUCE LEHMAN

*Attesting Officer*   *Commissioner of Patents and Trademarks*

United States Patent
Rozman

Patent Number: 5,625,541
Date of Patent: *Apr. 29, 1997

[54] LOW LOSS SYNCHRONOUS RECTIFIER FOR APPLICATION TO CLAMPED-MODE POWER CONVERTERS

[75] Inventor: Allen F. Rozman, Richardson, Tex.

[73] Assignee: Lucent Technologies Inc., Murray Hill, N.J.

[*] Notice: The term of this patent shall not extend beyond the expiration date of Pat. No. 5,303,138.

[21] Appl. No.: 503,684

[22] Filed: Jul. 18, 1995

Related U.S. Application Data

[63] Continuation-in-part of Ser. No. 225,027, Apr. 8, 1994, Pat. No. 5,528,482, which is a continuation-in-part of Ser. No. 54,918, Apr. 29, 1993, Pat. No. 5,303,138.

[51] Int. Cl.$^6$ .................. H02M 7/217; H02M 3/335
[52] U.S. Cl. ................. 363/21; 363/20; 363/89; 363/147; 327/309
[58] Field of Search ............... 363/21, 20, 89, 363/97, 126, 127; 327/309

[56] References Cited

U.S. PATENT DOCUMENTS

| | | | |
|---|---|---|---|
| 5,066,900 | 11/1991 | Bassett | 323/224 |
| 5,126,931 | 6/1992 | Jitaru | 363/21 |
| 5,268,830 | 12/1993 | Loftus, Jr. | 363/17 |
| 5,274,543 | 12/1993 | Loftus, Jr. | 363/127 |
| 5,303,138 | 4/1994 | Rozman | 363/21 |
| 5,353,212 | 10/1994 | Loftus, Jr. | 363/17 |
| 5,528,482 | 6/1996 | Rozman | 363/21 |

*Primary Examiner*—Peter S. Wong
*Assistant Examiner*—Shawn Riley

[57] ABSTRACT

A synchronous rectifier for use with a clamped-mode power converter uses in one embodiment a hybrid rectifier with a MOSFET rectifying device active in one first cyclic interval of the conduction/nonconduction sequence of the power switch and a second rectifying device embodied in one illustrative embodiment as a low voltage bipolar diode rectifying device active during an alternative interval to the first conduction/nonconduction interval. The gate drive to the MOSFET device is continuous at a constant level for substantially all of the second interval which enhances efficiency of the rectifier. The bipolar rectifier device may also be embodied as a MOSFET device. The subject rectifier may be used in both forward- and flyback-type power converters.

22 Claims, 5 Drawing Sheets